United States Patent [19]
Maeda et al.

[11] Patent Number: 5,762,858
[45] Date of Patent: Jun. 9, 1998

[54] PROCESS FOR PRODUCING MUFFLER HOSE

[75] Inventors: Ituro Maeda; Joji Kasugai, both of Ichinomiya; Hidetoshi Ishihara, Nagoya; Masaru Hattori, Kuwana-gun, all of Japan

[73] Assignee: Toyoda Gosei Co., Ltd., Aichi-ken, Japan

[21] Appl. No.: 597,446

[22] Filed: Feb. 2, 1996

[30] Foreign Application Priority Data

Feb. 2, 1995 [JP] Japan ..................... 7-016245
Jul. 14, 1995 [JP] Japan ..................... 7-201732

[51] Int. Cl.⁶ .............................................. B29C 47/20
[52] U.S. Cl. ...................... 264/516; 264/515; 425/503
[58] Field of Search ............................ 264/515, 516, 264/536, 154, 156; 181/227, 249; 425/525, 503, 527

[56] References Cited

U.S. PATENT DOCUMENTS 5,353,930  10/1994  Berry, Jr. ........................ 264/536

FOREIGN PATENT DOCUMENTS 47-35548   9/1972  Japan ........................ 264/536
53-30660   3/1978  Japan ........................ 264/515
58-15708   1/1983  Japan ........................ 181/227
60-250934  12/1985 Japan .
61-83020   4/1986  Japan ........................ 264/516

*Primary Examiner*—Catherine Timm
*Attorney, Agent, or Firm*—Cushman Darby & Cushman IP Group of Pillsbury Madison & Sutro LLP

[57] ABSTRACT

A process for producing a muffler hose having opposite ends, an intermediate portion having a noise-reducing communication hole, and a noise-reducing expansion chamber. The process includes the steps of fitting a protector at the opposite ends of the hose, and disposing the hose and the protectors in a separable blow-molding mold having a jaw; extruding a tubular parison around the hose and the protectors, closing the blow-molding mold, reducing the parison diametrically at two axially-apart positions by the jaw, clamping the parison around the hose at two axially-opposite positions of the hose, the two axially-opposite positions being intervened by the communication hole, and placing the opposite ends of the parison around the protectors; and blowing air into the parison through one of the protectors, and the communication hole of the hose to expand the parison, thereby forming the expansion chamber. The process can produce the muffler hose, having high accuracy on the outer periphery at the opposite ends, at reduced production cost.

9 Claims, 15 Drawing Sheets

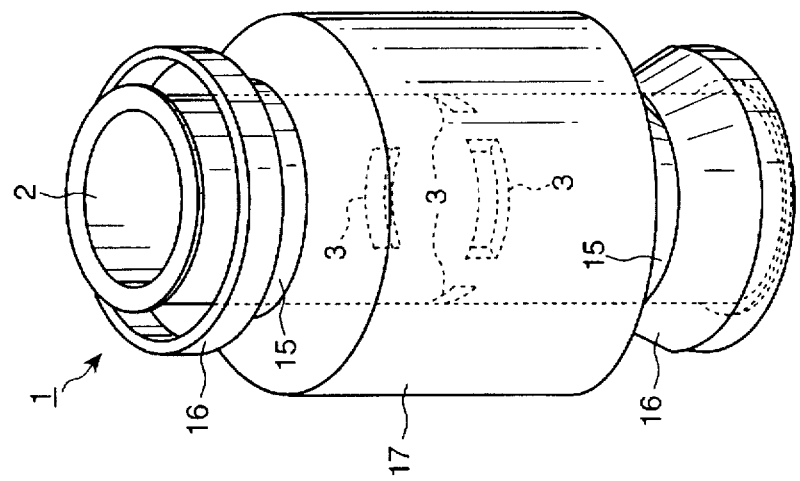
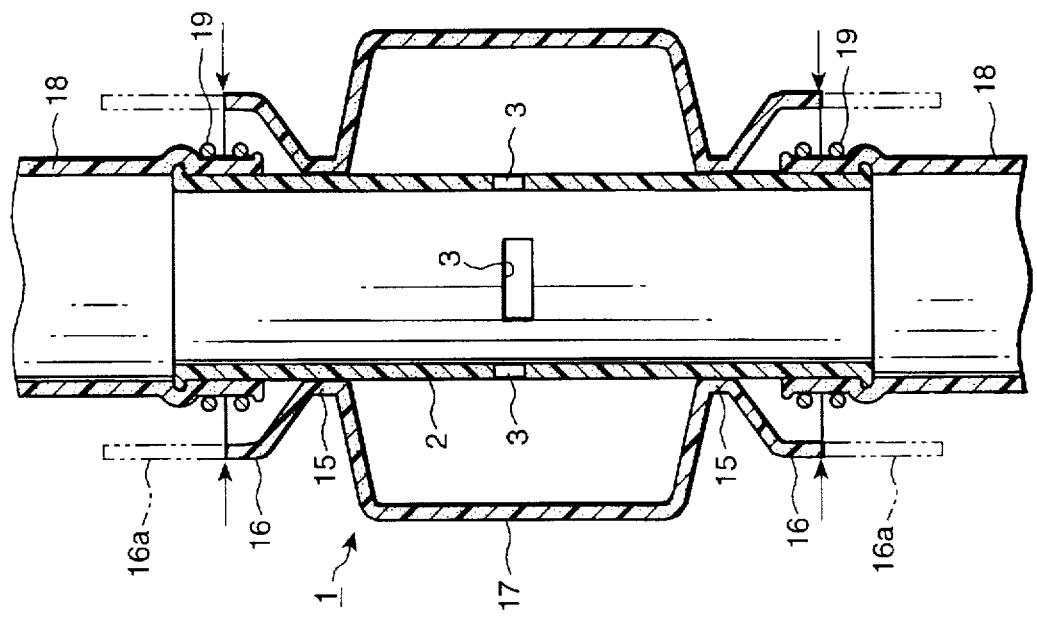

5,762,858

1

PROCESS FOR PRODUCING MUFFLER HOSE

The priority documents, Japanese Patent Application No. 7-16245 filed in Japan on Feb. 2, 1995 and Japanese Patent Application No. 7-201732, filed in Japan on Jul. 14, 1995 are hereby incorporated into the present specification by reference.

1. Field of the Invention

The present invention relates to a process for producing a muffler-type hose. The resulting muffler hose is especially suitable for an intake system of engine. The muffler hose reduces noises which generate therein, or which propagate therein. More particularly, the present invention relates to a muffler hose which has opposite ends, an intermediate portion disposed between the opposite ends having a noise-reducing communication hole, and a noise-reducing expansion chamber disposed around the communication hole. The expansion chamber, for instance, is formed by blow molding.

2. Description of Related Art

A muffler hose is often applied to an inlet air cleaner hose for internal combustion engines. FIGS. 13 and 14 illustrate a conventional muffler hose 50, and a process for producing the same. The muffler hose 50 is manufactured in the following order; namely:

(i) An air cleaner hose 51 is formed with synthetic resin by blow molding, injection molding, or extrusion molding. A noise-reducing communication hole 52 is formed at a predetermined position of the air cleaner hose 51 by machining;

(ii) The air cleaner hose 51 is set in an opened, separable blow-molding mold (not shown) by a slider mechanism (not shown);

(iii) A tubular parison 53 made of molten resin is extruded around the air cleaner hose 51 from a crosshead 57;

(iv) As illustrated in FIG. 14, the parison 53 is reduced diametrically at portions 54 adjacent to the opposite ends by closing the blow-molding mold, and is put on the outer periphery of the opposite ends of the air cleaner hose 51;

(v) Air is blown into the parison 53 via the noise-reducing communication hole 52 to expand the parison 53, thereby forming a noise-reducing expansion chamber 55; and (vi) The blow-molding mold is opened again, and the parison 53 is deflashed at the opposite ends 56 which extend beyond the opposite ends of the air cleaner hose 51.

At the opposite ends of the thus completed air cleaner hose 51, an independent extension hose 58 is usually connected as illustrated in FIG. 14. Hence, it is necessary to give the opposite ends high dimensional and configurational accuracy. However, in the conventional air cleaner hose 51, the opposite ends 54 of the parison 53 are extended and put on the outer periphery of the opposite ends of the air cleaner hose 51, and determine the dimensional and configurational accuracy. However, the opposite ends 54 usually have poor dimensional and configurational accuracy. Accordingly, it is necessary to finish the outer periphery of the opposite ends 54 in order to upgrade the poor dimensional and configurational accuracy. Such a finishing operation results in increasing production cost.

Further, the parison 53 is deflashed to remove the opposite-end flashes 56, and thereby deflashed traces arise at the opposite ends 54. The deflashed traces adversely affect the dimensional and configurational accuracy of the opposite ends 54. Consequently, it is necessary to carry out the deflashing operation with good accuracy. Thus, it takes longer to complete the deflashing operation.

2

Furthermore, it is necessary to fix the extension hose 58 at the opposite ends of the air cleaner hose 51 by means of a clamp 59, such as a wire clamp, or a band clamp. The clamps 59 increase component-part cost.

SUMMARY OF THE INVENTION

It is therefore a primary object of the present invention to provide a process for producing a muffler hose, so as to upgrade the dimensional and configurational accuracy of the opposite ends of the resulting muffler hose, to simplify or obviate the deflashing operation onto the opposite ends of a parison, and to reduce overall manufacturing cost. For example, when blow molding a noise-reducing expansion chamber around a hose having a noise-reducing communication hole, the process inhibits the opposite-end flashes of a parison from extending and being put on the opposite ends of the resulting muffler hose.

It is a secondary object of the present invention to provide a process for producing a muffler hose, which enables further reduction of the overall manufacturing cost. For instance, the process enables one to connect an extension hose to the opposite ends of the resulting muffler hose without employing a clamp.

A first embodiment of a muffler-hoseproduction process according to the present invention can carry-out the aforementioned objects. The first embodiment is a process for producing a muffler hose. The muffler hose has opposite ends, an intermediate portion disposed between the opposite ends and having a noise-reducing communication hole, and a noise-reducing expansion chamber disposed around the communication hole. The first embodiment includes the steps of:

fitting a protector, having an outside diameter larger than that of the hose, at the opposite ends of the hose to plug the opposite ends of the hose, and disposing the hose with the fitted protectors in a separable blow-molding mold having a jaw, the mold being in an opened condition;

extruding a tubular parison, having opposite ends and made of molten resin, around the hose and the protectors;

closing the blow-molding mold and reducing a diameter of the parison at two positions, spaced from each other in an axial direction of the parison, by the jaw the parison contacting the hose at two positions such that the parison is clamped around the hose, and ensuring that the opposite ends of the parison are disposed around the protectors; and blowing air into the parison through at least one of the protectors and the communication hole of the hose to expand a part of the parison, said part being disposed between the two axially-spaced positions, thereby forming the expansion chamber.

In the first embodiment, the opposite-end flashes of the parison are placed around the protectors in the blow-molding-mold closing step. Accordingly, the opposite-end flashes of the parison do not contact the outer periphery of the opposite ends of the hose. As a result, the outer periphery of the opposite ends of the hose is protected with little deterioration in terms of the dimensional and configuration accuracy, and rarely require a finishing operation.

Moreover, the first embodiment enables one to freely remove the opposite-end flashes at a proper position. Additionally, in the first embodiment, it is unnecessary to deflash the opposite-end flashes of the parison with high accuracy, because the deflashed traces have little affect on the dimensional and configurational accuracy in the outer periphery of the opposite ends of the hose. As a result, it is possible to carry-out a deflashing operation in a short period of time. In certain cases, it is possible to obviate deflashing the opposite ends of the parison.

Thus, when blow molding a noise-reducing expansion chamber around a hose having a noise-reducing communication hole, the first embodiment can inhibit the opposite-end flashes of a parison from extending and being put on the opposite ends of the resulting muffler hose, and thereby enhance the dimensional and configurational accuracy at the opposite ends of the resulting muffler hose. At the same time, the first embodiment can simplify or obviate deflashing the opposite ends of the parison, and thereby reduce overall manufacturing cost.

A second embodiment of a muffler hose production process according to the present invention can also carry-out the aforementioned objects. The second embodiment is a process for producing a muffler hose. The muffler hose includes an intermediate hose, an extension hose, and a noise-reducing expansion chamber. The intermediate hose has opposite ends, an intermediate portion, disposed between the opposite ends, and having a noise-reducing communication hole. The extension hose has a connector portion, and is connected around the opposite ends of the intermediate hose. The noise-reducing expansion chamber is disposed around the communication hole. The second embodiment includes the steps of:

connecting the connector portion of the extension hose around the opposite ends of the intermediate hose, fitting a protector, having an outside diameter larger than that of the extension hose, around the extension hose so as to expose a part of the connector portion, and disposing the intermediate hose with the extension hose connected and the extension hose with the protectors fitted therein in a separable blowmolding mold having a jaw, the mold being in an opened condition;

extruding a tubular parison, having opposite ends and made of molten resin, around the intermediate hose and the protectors;

closing the blow-molding mold and reducing a diameter of the parison at two positions, spaced apart from each other in an axial direction of the parison, by the jaw, contacting the parison at two positions of the intermediate hose opposite to each other in an axial direction of the intermediate hose with respect to the communication hole, clamping the parison around the extension hose, and placing the opposite ends of the parison around the protectors; and blowing air into the parison through at least one of the protectors and the communication hole of the intermediate hose to expand a part of the parison, said part being disposed between the two axially-spaced positions, thereby forming the expansion chamber.

In the second embodiment, the two axially-spaced positions of the parison are reduced diametrically, and the connector portions of the extension hoses are further clamped around the opposite ends of the intermediate hose in the blow-molding-mold closing step. Accordingly, the intermediate hose and the noise-reducing expansion chamber are connected to the extension hoses. As a result, it is unnecessary to employ a clamp, such as a wire clamp, or a band clamp, to fasten the intermediate hose and the expansion chamber to the extension hoses.

Thus, when carrying-out the aforementioned blow-molding operation, the second embodiment enables one to connect the extension hose around the opposite ends of the intermediate hose without a clamp. Hence, the second embodiment contributes to further reducing overall manufacturing cost.

In addition, the hose or the intermediate hose having the noise-reducing communication hole can be produced by the following process. For example, the process can comprise the steps of:

blow molding a hose or an intermediate hose with synthetic resin, the hose or the intermediate hose having opposite ends, an intermediate portion, and a projection disposed on the intermediate portion, the projection formed as a ring or arc, and projecting in a centripetal or centrifugal direction; and cutting a part of the projection at least to form a noise-reducing communication hole where the projection had existed.

In this process for producing the hose or the intermediate hose, the part to be cut is formed as the projection by blow molding. Accordingly it is possible to cut the part without damaging portions neighboring the part to be cut, and to carry out the cutting operation with a reduced man-hour requirement.

Thus, this hose- or intermediate-hoseproduction process enables one to produce the hose or the intermediate hose at less manufacturing cost and with ease.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure:

FIG. 5 is a cross-sectional view for illustrating a deflashing step in the First Preferred Embodiment;

FIG. 6 is a perspective view for illustrating a muffler hose produced by the First Preferred Embodiment;

DETAILED DESCRIPTION OF THE PREFERRED EMBODIMENTS

Having generally described the present invention, a further understanding can be obtained by reference to the specific preferred embodiments which are provided herein for the purpose of illustration only and are not intended to limit the scope of the appended claims.

First Preferred Embodiment

A First Preferred Embodiment according to the present invention will be hereinafter described with reference to FIGS. 1 through 6. It is an application to an inlet air cleaner hose for internal combustion engines.

FIGS. 1 through 5 illustrate a series of steps for producing a muffler hose 1 as shown in FIG. 6. The muffler hose 1 completed by the method of the First Preferred Embodiment is connected with an extension hose at the opposite ends, and is produced in the following order of steps.

(Hose-preparing step)

Figure 1:
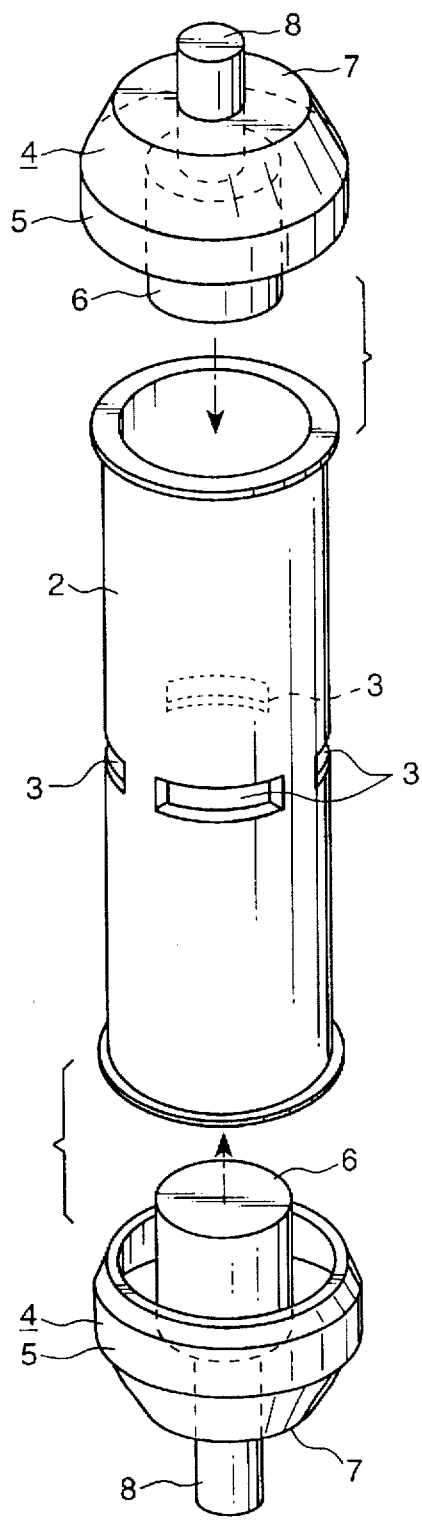
FIG. 1 is an exploded perspective view for illustrating an air cleaner hose and protectors in a First Preferred Embodiment according to the present invention.

As illustrated in FIG. 1, intermediate hose 2, hereinafter referred to as an air cleaner hose 2 is formed with synthetic resin by blow molding. The air cleaner hose 2 is provided with four noise-reducing communication holes 3 by machining. Note that the air cleaner hose 2 can be formed by injection molding, or extrusion molding.

(Mold-setting Step)

Figure 2:
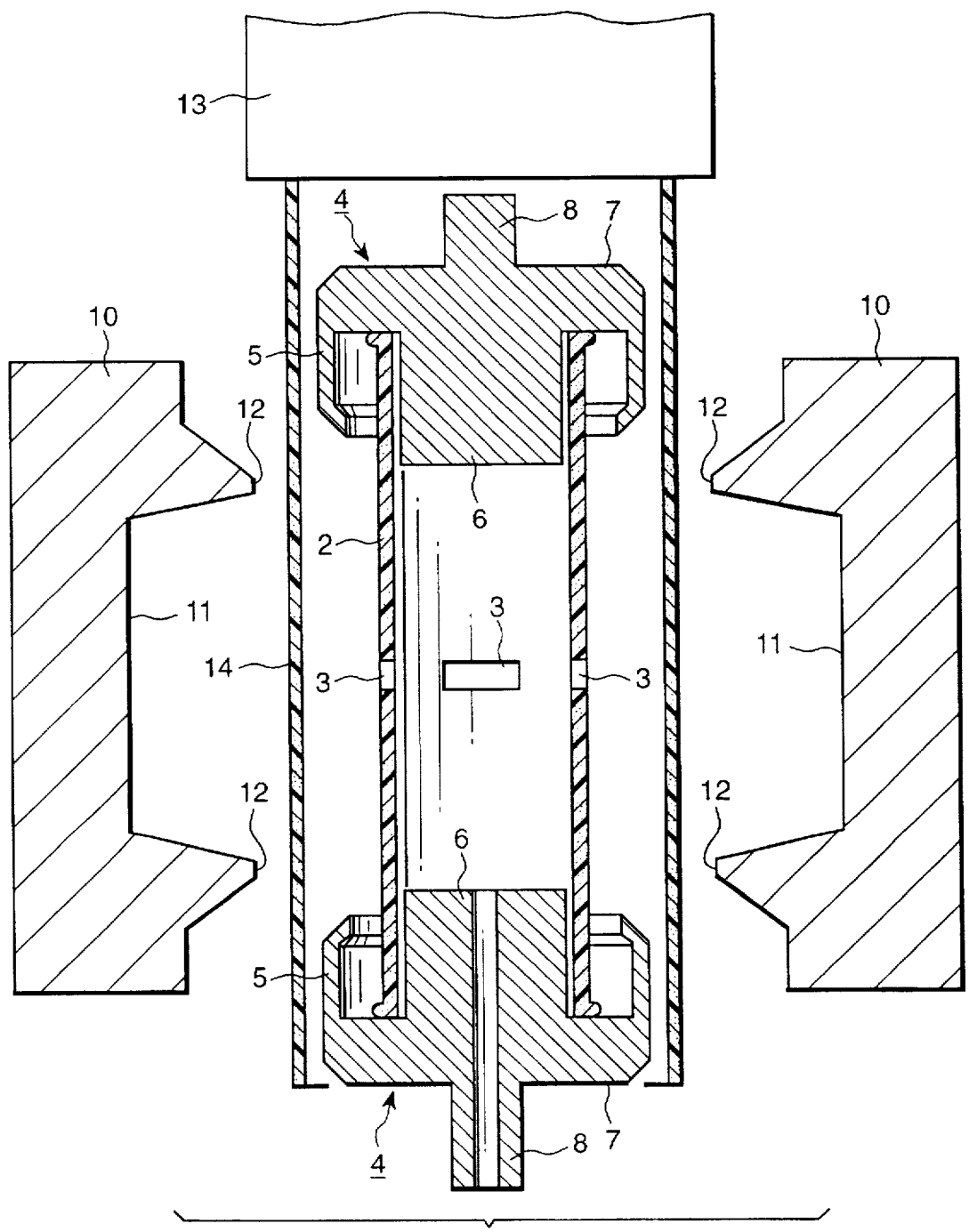
FIG. 2 is a cross-sectional view for illustrating a mold-setting step in the First Preferred Embodiments.

As illustrated in FIGS. 1 and 2, a protector 4 is fitted into the air cleaner hose 2 at the opposite ends thereof. The protector 4 includes a sleeve 5, a plug 6, a base 7, and a projection 8, and is made from a metal of high rigidity. The sleeve 5 is disposed around the opposite ends of the air cleaner hose 2, with the plug 6 fitted into the opposite ends of the air cleaner hose 2. The base 7 connects the sleeve 5 with the plug 6. The projection 8 projects from the base 7. When the plug 6 is fitted into the air cleaner hose 2, the protector aligns of itself with respect to the center of the air cleaner hose 2.

Then, a sliding mechanism (not shown) grips the plug 8 of the protectors 4, and sets the air cleaner hose 2 with the fitted protectors 4 in separable blow-molding mold halves 10, 10, which have been previously separated or opened, as illustrated in FIG. 2. Specifically, the sliding mechanism slides the air cleaner hose 2 with the fitted protectors 4 in a direction from the bottom to the top of the drawing to set the air cleaner hose 2, and so on, between the mold halves 10, 10. The mold halves 10, 10 have a concaved-cavity surface 11 and jaws 12, 12, and are made separable in the horizontal direction.

(Parison-extruding Step)

As illustrated in FIG. 2, a crosshead 13 of an extruder is disposed above the hose 2, and extrudes a tubular parison 14 made from molten resin around the air cleaner hose 2 and the protectors 4.

(Mold-closing Step)

Figure 3:
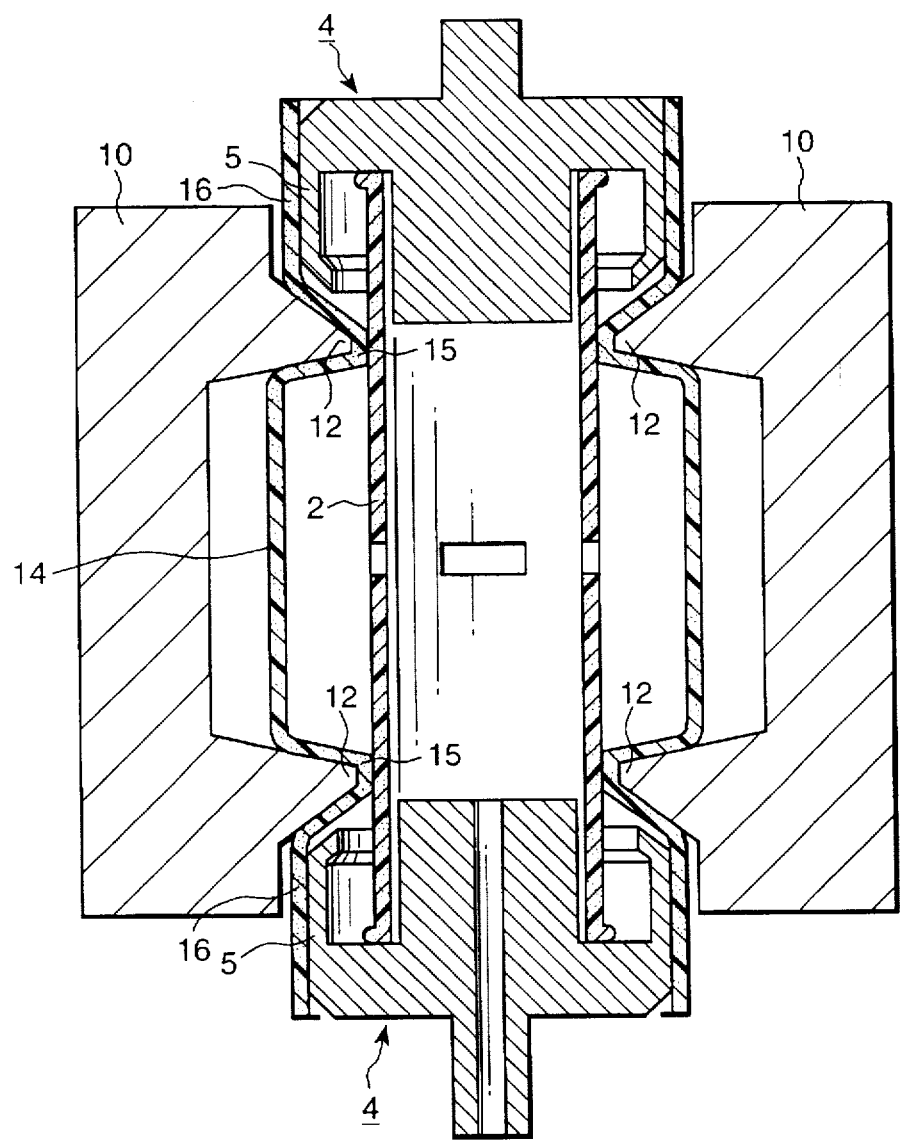
FIG. 3 is a cross-sectional view for illustrating a mold-closing step in the First Preferred Embodiment.

As illustrated in FIG. 3, the blow-molding mold halves 10, 10 are closed, and the jaws 12, 12 of the mold halves 10, 10 reduce the parison 14 diametrically at two axially-spaced positions 15, 15. Thus, the jaws 12, 12 clamp the parison 14 onto the outer periphery of the air cleaner hose 2. At the same time, opposite-end flashes 16, 16 of the parison 14 cover the outer periphery of the sleeves 5, 5 of the protectors 4, 4.

(Air-blowing Step)

Figure 4:
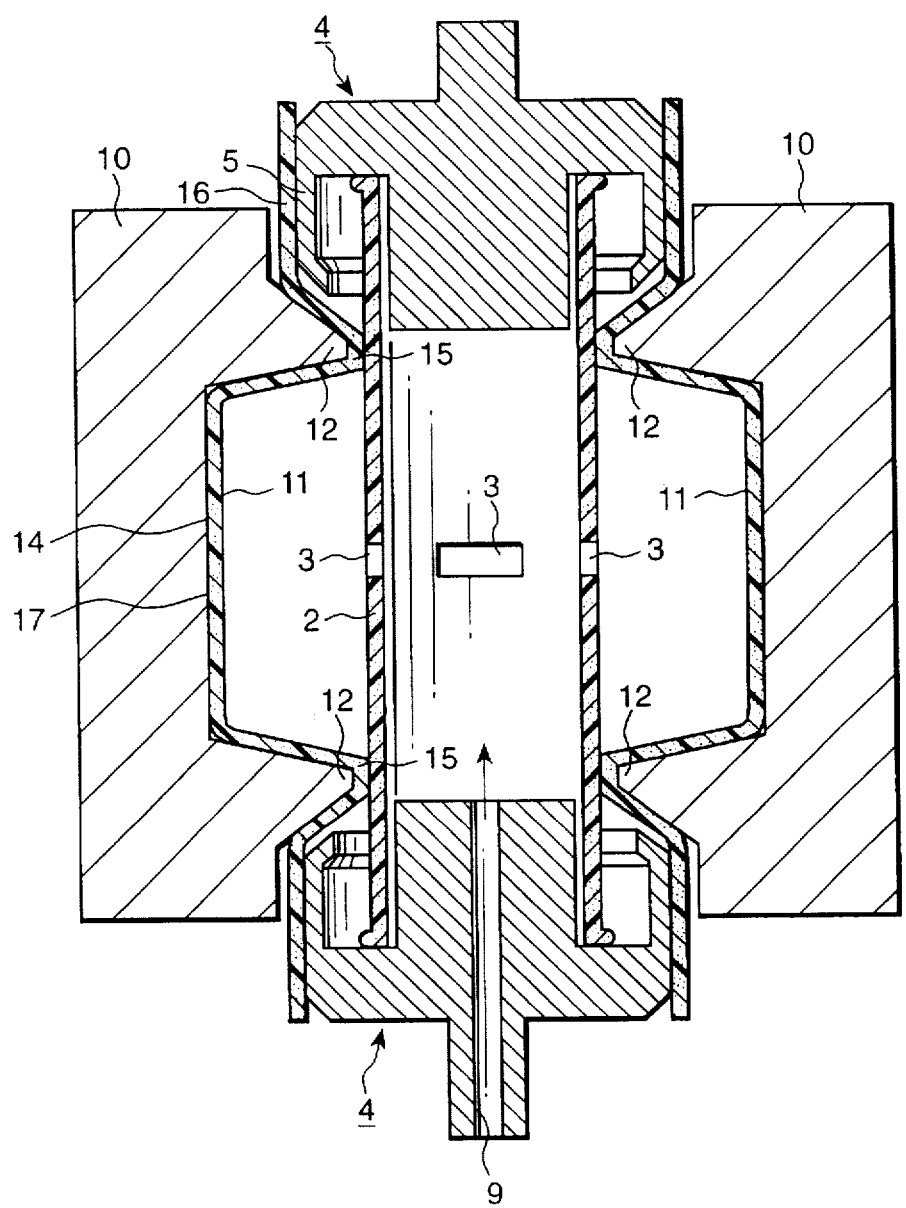
FIG. 4 is a cross-sectional view for illustrating an air-blowing step in the First Preferred Embodiment.

As illustrated in FIG. 4, air is blown into the parison 14 via an air flow passage 9 and the noise-reducing communication holes 3. Accordingly, the parison 14 is expanded between the two axially-spaced positions 15, 15, and brought into contact with the concaved-cavity surfaces 11, 11. A noise-reducing expansion chamber 17 is thus formed. Note that the air flow passage 9 is formed only in the lower protector 4 in the drawing.

(Deflashing Step)

After the parison 14 is cooled and cured, the blow-molding mold halves 10, 10 are opened to remove the air cleaner hose 2, etc. Then, as illustrated in FIG. 5, the opposite-end flashes 16, 16 of the parison 14 are cut at a desired position. In the First Preferred Embodiment, the opposite-end flashes 16, 16 are cut at the position specified with the arrows of the drawing in order to remove the leading ends 16a, 16a of the opposite-end flashes 16, 16, because the leading ends 16a, 16a are likely to undulate. Thus, the rest of the opposite-end flashes 16, 16 remain as a part of a final product. In this way, the muffler hose 1 is completed as illustrated in FIG. 6.

Finally, as illustrated in FIG. 5, extension hoses 18, 18 are fitted on the outer periphery of the opposite ends of the air cleaner hose 2, and are clamped by wire clamps 19, 19 at the trailing end. Thus, the extension hoses 18, 18 are connected with the muffler hose 1.

In accordance with the First Preferred Embodiment as described above, the opposite-end flashes 16, 16 cover the outer periphery of the sleeves 5, 5 of the protectors 4, 4, and do not cover the outer periphery of the opposite ends of the air cleaner hose 2. As a result, the outer periphery of the opposite ends of the air cleaner hose 2 is protected with minimal deterioration in terms of the dimensional and configurational accuracy, and hardly requires a finishing operation. Accordingly, the extension hoses 18, 18 can be connected to the opposite ends of the air cleaner hose 2 with good accuracy.

Moreover, the opposite-end flashes 16, 16 of the parison 14 can be deflashed at any desired position, and the resulting deflashed traces do not adversely affect the dimensional and configurational accuracy of the opposite ends of the air cleaner hose 2. Consequently, the deflashing operation rarely requires high accuracy, and can be carried-out in a short period of time.

Second Preferred Embodiment

A Second Preferred Embodiment according to the present invention will be hereinafter described with reference to FIGS. 7 through 12.

Figure 10:
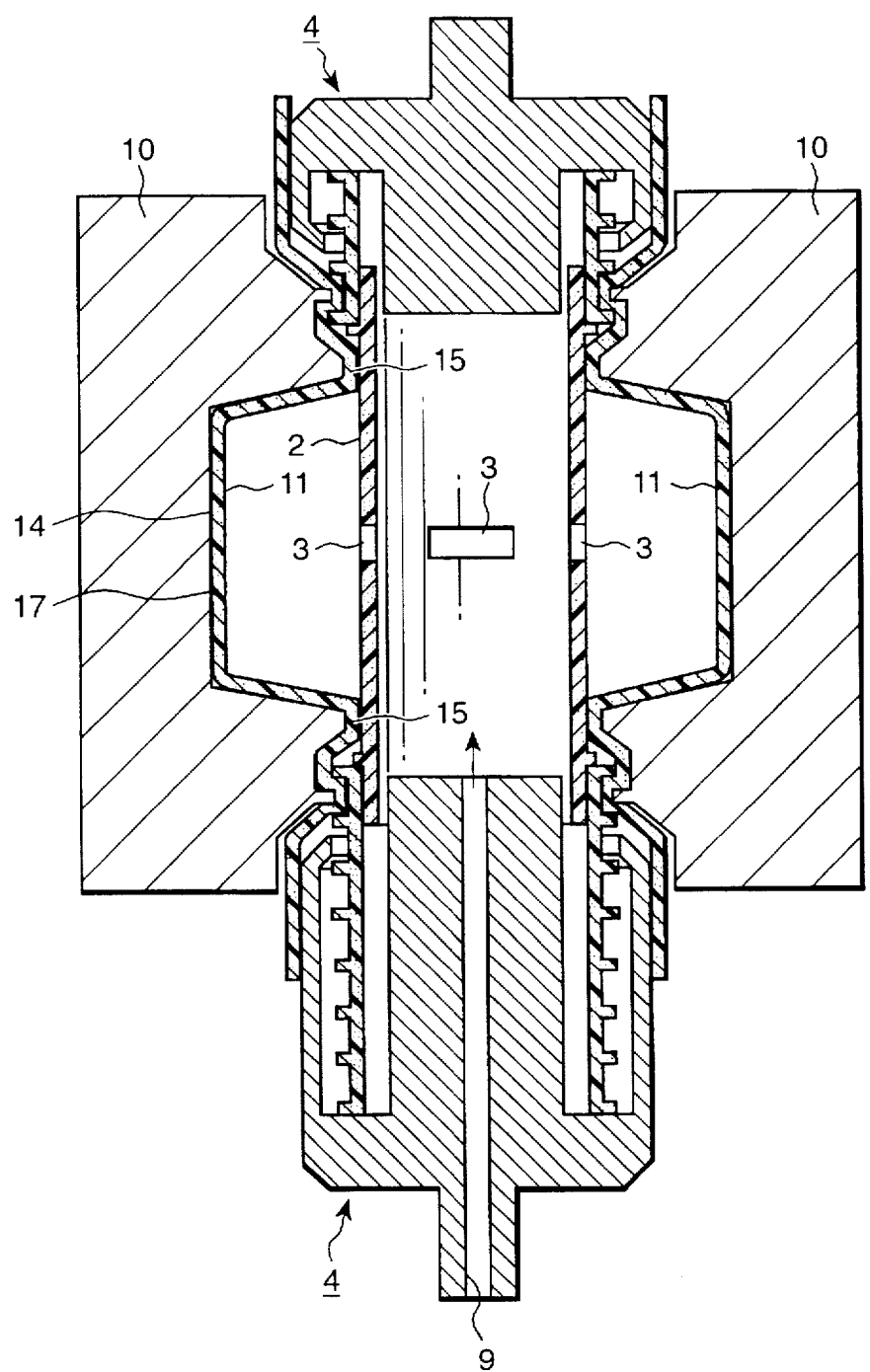
FIG. 10 is a cross-sectional view for illustrating an air-blowing step in the Second Preferred Embodiment.
Figure 11:
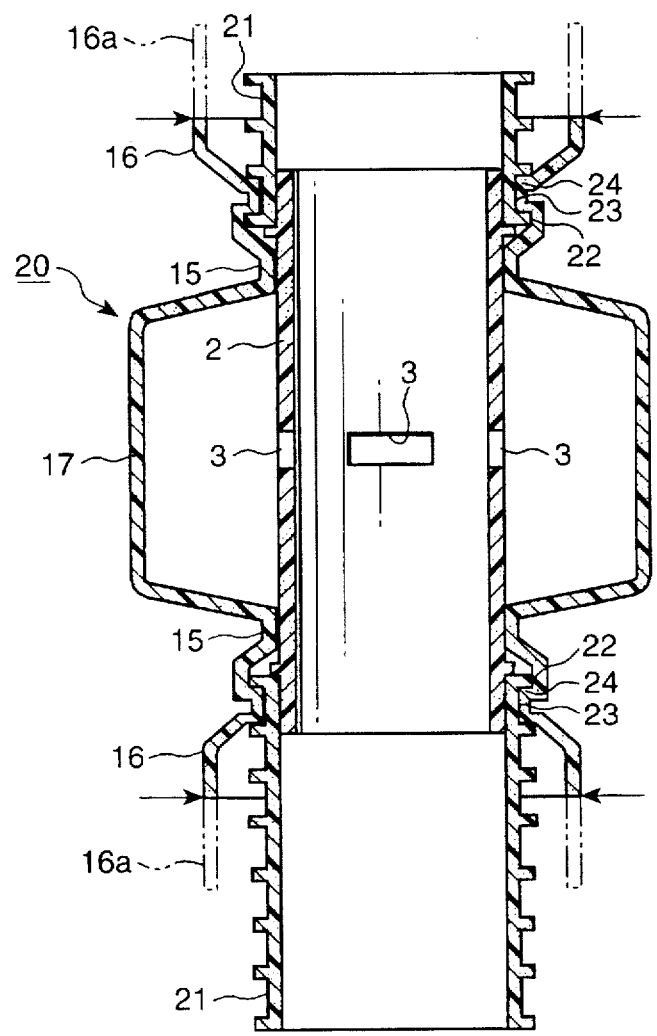
FIG. 11 is a cross-sectional view for illustrating a deflashing step in the Second Preferred Embodiment.
Figure 12:
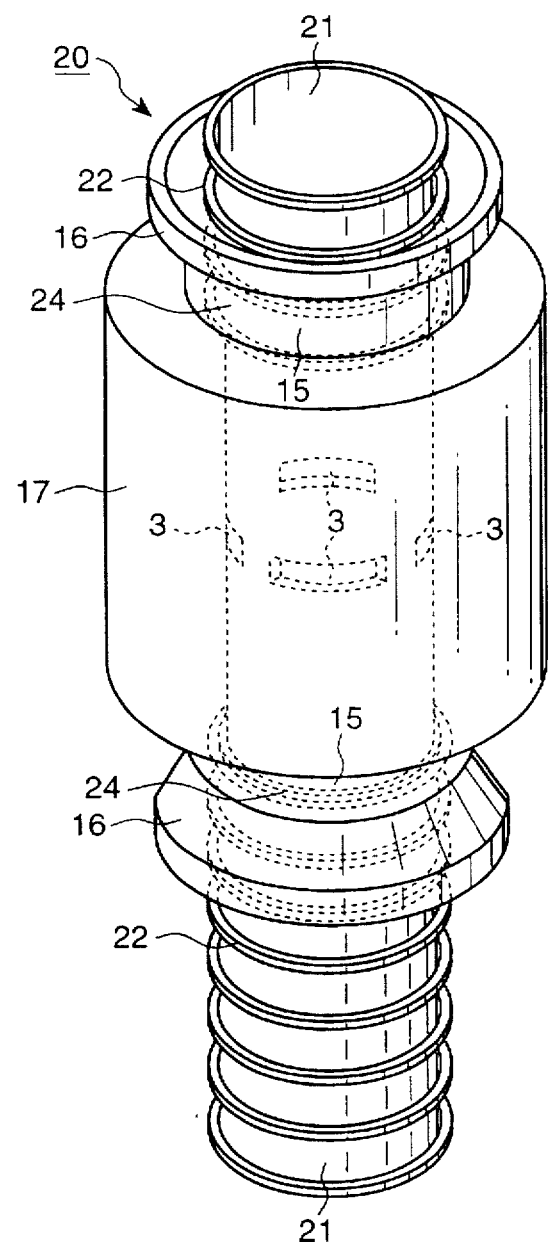
FIG. 12 is a perspective view for illustrating a muffler hose produced by the Second Preferred Embodiment.
Figure 14:
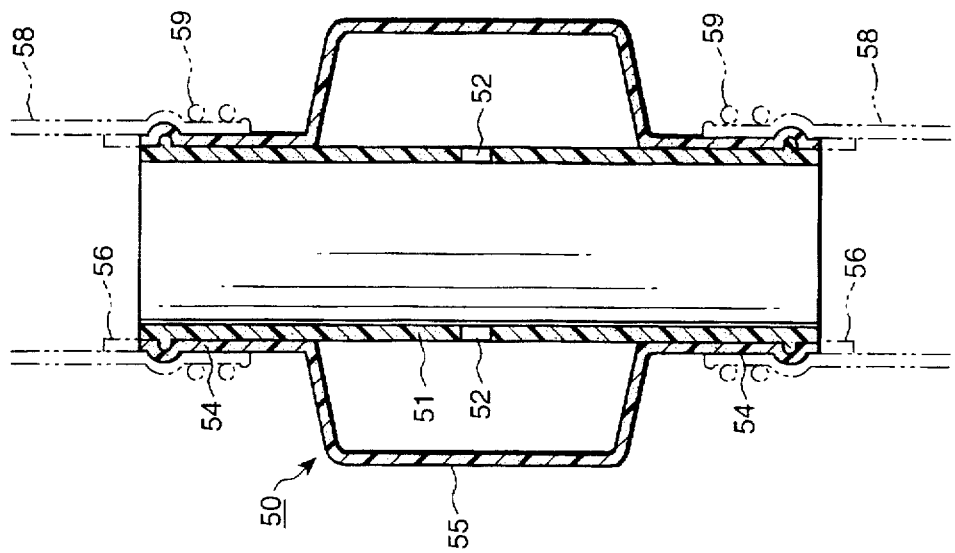
FIG. 14 is a cross-sectional view for illustrating a muffler hose produced by the conventional muffler-hose-production process.
Figure 13:
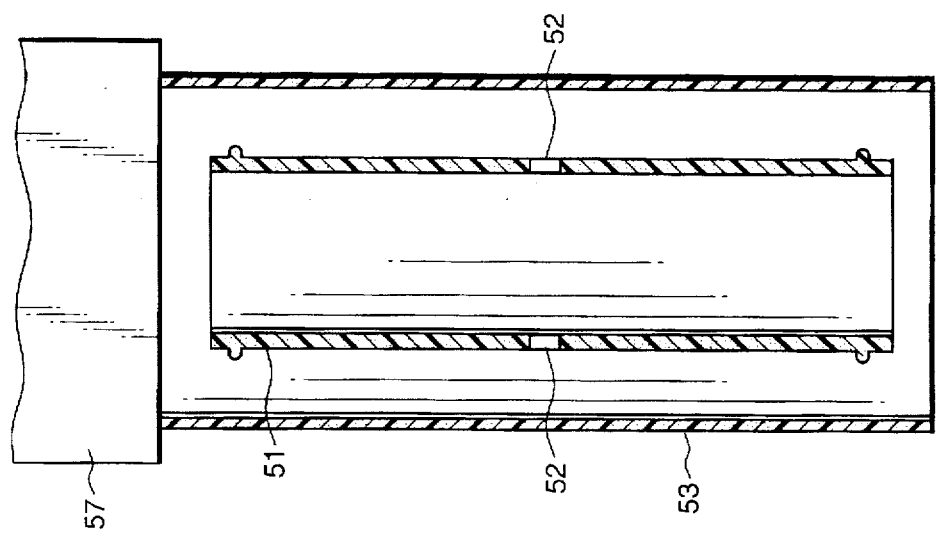
FIG. 13 is a cross-sectional view for illustrating one of the steps of a conventional muffler-hose-production process.

FIGS. 7 through 11 illustrate a series of steps for producing a muffler hose 20 as shown in FIG. 12. The muffler hose 20 completed by method of the Second Preferred Embodiment requires no clamping device for fastening an extension hose 21 at the opposite ends, but is connected with the extension hose 21 at the opposite ends in a blow-molding step. The muffler hose 20 is produced in the following order of steps.

(Hose-preparing step)

Figure 7:
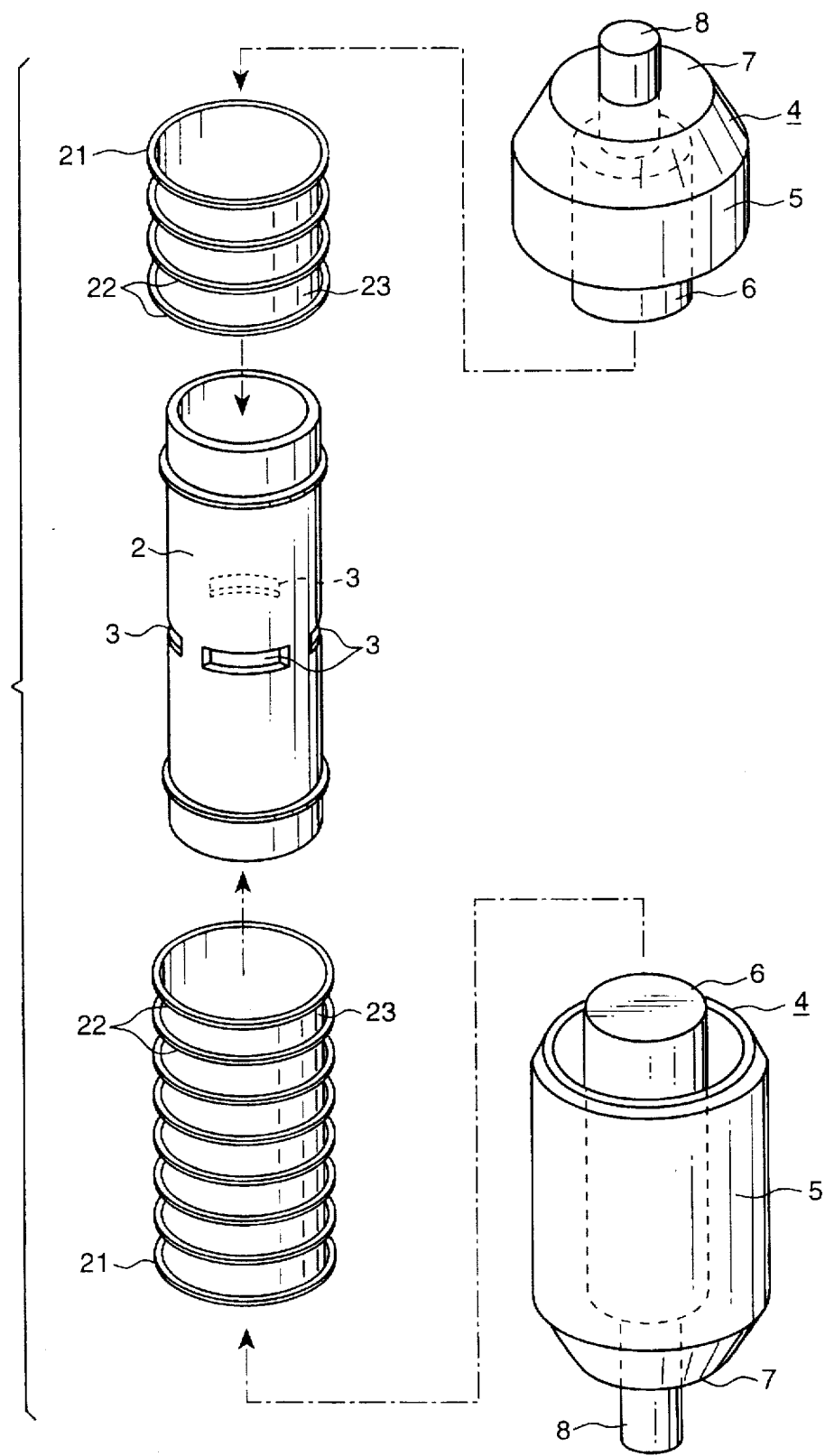
FIG. 7 is an exploded perspective view for illustrating an air cleaner hose, extension hoses and protectors in a Second Preferred Embodiment according to the present invention.

As illustrated in FIG. 7, an air cleaner hose 2 is formed in a manner similar to the hose-preparing step of the First Preferred Embodiment, and two extension hoses 21 were further formed. The extension hoses 21 are provided with a plurality of annular projections which are formed on the outer periphery of the extension hoses 21, and are arranged at short intervals.

(Mold-setting Step)

Figure 8:
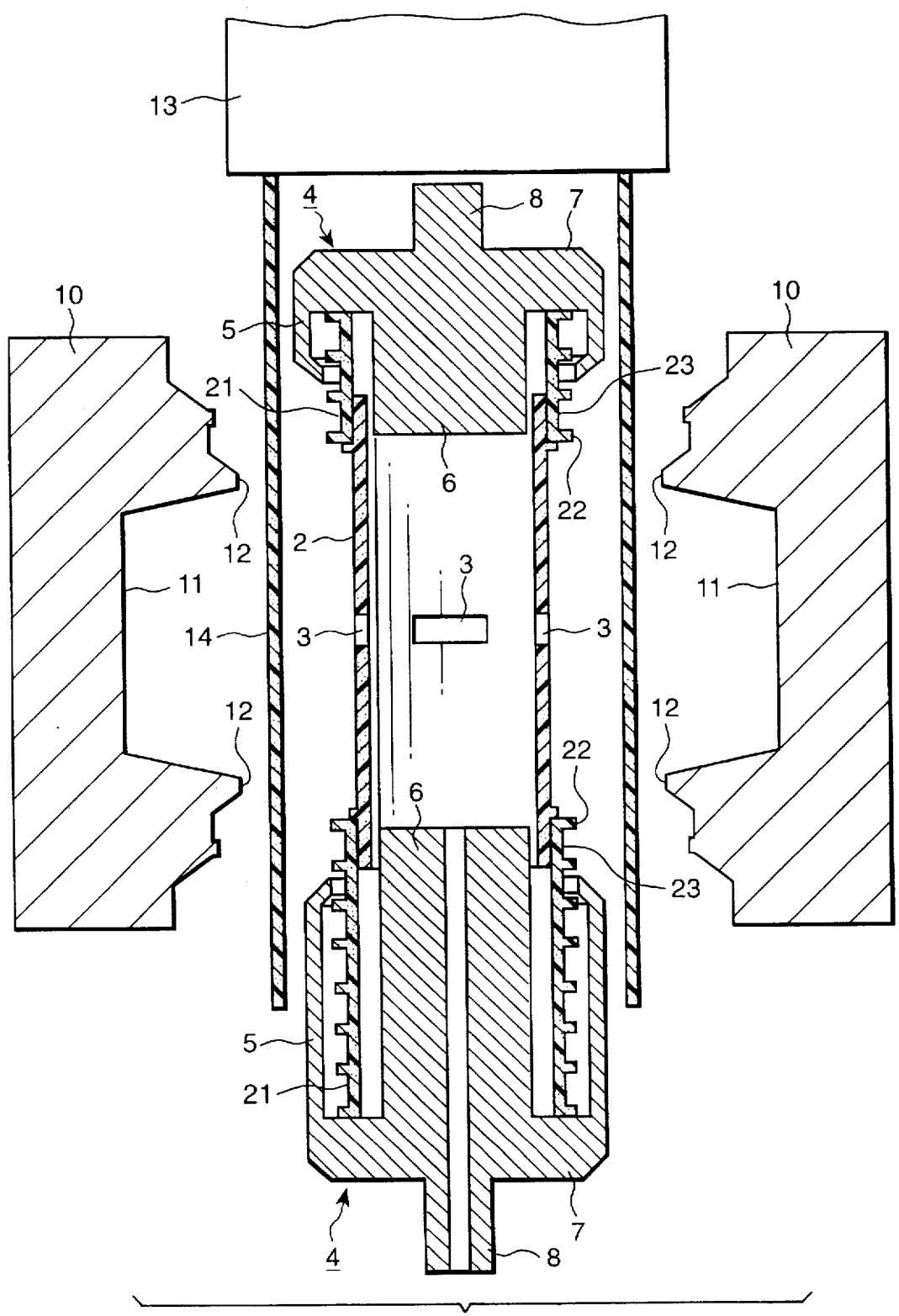
FIG. 8 is a cross-sectional view for illustrating a mold-setting step in the Second Preferred Embodiment.

As illustrated in FIGS. 7 and 8, the extension hose 21 is fitted around the opposite ends of the air cleaner hose 2. Then, a protector 4 is fitted into the free end of the extension hoses 21. The protector 4 has a similar construction as that of the protector 4 used in the First Preferred Embodiment. Note that, as illustrated in FIG. 8, the protector 4 is fitted around the free end of the extension hoses 21 so as to expose a part of a connector end 23 of the extension hoses 21.

Then, a sliding mechanism (not shown) grips the plug 8 of the protectors 4, and sets the air cleaner hose 2 with the extension hoses 21 and the protectors 4 between separable blow-molding mold halves 10, 10, which have been separated previously as illustrated in FIG. 8. Specifically, the sliding mechanism slides the air cleaner hose 2 with the extension hoses 21 and the protectors 4 in the direction from the bottom to the top of the drawing to set the air cleaner hose 2, and so on, between the mold halves 10, 10.

(Parison-extruding Step)

As illustrated in FIG. 8, a crosshead 13 of an extruder is disposed above, and extrudes a tubular parison 14 made from molten resin around the air cleaner hose 2, the extension hoses 21 and the protectors 4.

(Mold-closing Step)

Figure 9:
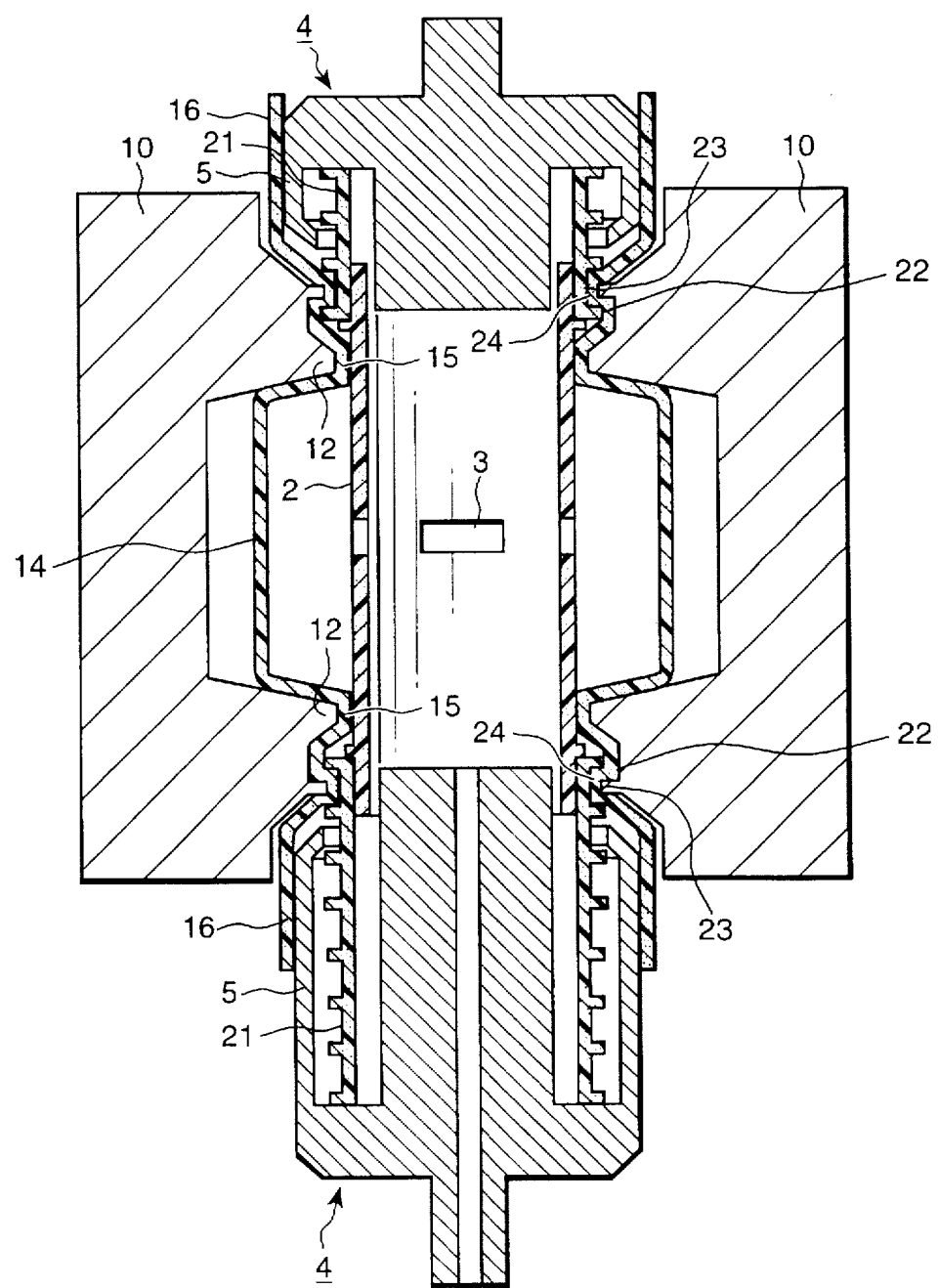
FIG. 9 is a cross-sectional view for illustrating a mold-closing step in the Second Preferred Embodiment.

As illustrated in FIG. 9, the blow-molding mold halves 10, 10 are closed, and the jaws 12, 12 of the mold halves 10, 10 reduce the parison 14 diametrically at two axially-spaced positions 15, 15. Thus, the jaws 12, 12 clamp the parison 14 onto the outer periphery of the air cleaner hose 2. At the same time, opposite-end flashes 16, 16 of the parison 14 cover the outer periphery of the protectors 4, 4. Note that, in the Second Embodiment, roots 24, 24 of the opposite-end flashes 16, 16 are also reduced diametrically but slightly so as to engage with one of the annular projections 22 of the extension hoses 21.

(Air-blowing Step)

As illustrated in FIG. 10, air is blown into the parison 14 to form a noise-reducing expansion chamber 17 in the same manner as the air-blowing step of the First Preferred Embodiment.

(Deflashing Step)

After the parison 14 is cooled and cured, the blow-molding mold halves 10, 10 are opened to remove the air cleaner hose 2, etc., in the same manner as the deflashing step of the First Preferred Embodiment. Then, as illustrated in FIG. 11, the opposite-end flashes 16, 16 of the parison 14 are cut to remove their leading ends 16a, 16a. In this way, the muffler hose 20 is completed as illustrated in FIG. 12.

In accordance with the Second Preferred Embodiment described above, it is possible to produce the same advantages as those of the First Preferred Embodiment. Moreover, in accordance with the Second Preferred Embodiment, the parison 14 is reduced diametrically not only at the two axially-apart positions 15, 15, but also at the roots 24, 24 of the opposite-end flashes 16, 16. Thus, the parison 14 is clamped around the outer periphery of the connector end 23 of the extension hoses 21, and thereby the air cleaner hose 2 is connected with the noise-reducing chamber 17 and the extension hoses 21. As a result, it is unnecessary to employ a clamping device.

Especially, in the Second Preferred Embodiment, the extension hoses 21 are provided with the annular projections 22 on the outer periphery of the connector end 23, and one of the annular projections 22 engages with the root 24 of the clamped parison 14. Thus, the completed muffler hose 20 exhibits strong connection strength at the connector ends 23. Note that the annular projections 22 can be a thread-like projection, or an independent simply-convexed projection.

The present invention is not limited to the arrangements of the First and Second Preferred Embodiments described above. It is possible to modify them as follows within the spirit or scope of the present invention.

For instance, in the First and Second Preferred Embodiments, the opposite end flashes 16, 16 are deflashed to achieve good appearance. Therefore, if the opposite-ends flashes 16, 16 do not adversely affect the appearance of the resulting muffler hose, or if the opposite-ends flashes 16, 16 do not trouble the subsequent operation like a vehicle assembly operation, it is possible to obviate the deflashing step. Moreover, it is possible to apply the present invention not only to air cleaner hoses, but also hoses for the other applications which are concerned about noises.

Third Preferred Embodiment

In the First and Second Preferred Embodiments, the air cleaner hose 2 is provided with a plurality of noise-reducing communication holes 3. The communication holes 3 are opened in the intermediate portion of the air cleaner hose 2. The air cleaner hose 2 can be prepared by processes other than the ordinary process described above. For example, it is possible to prepare the air cleaner hose 2 by one of the following processes with ease and at low cost.

Figure 15:
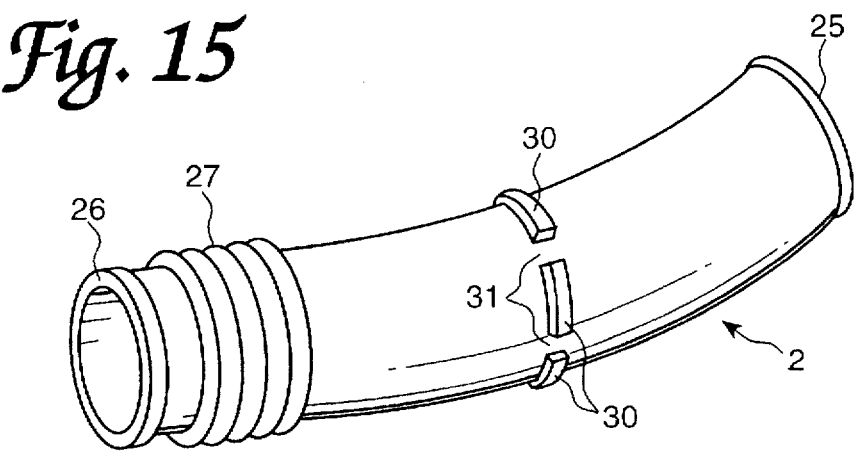
FIG. 15 is a perspective view for illustrating a synthetic-resin hose after a blow-molding step in a Third Preferred Embodiment according to the present invention.
Figure 16:
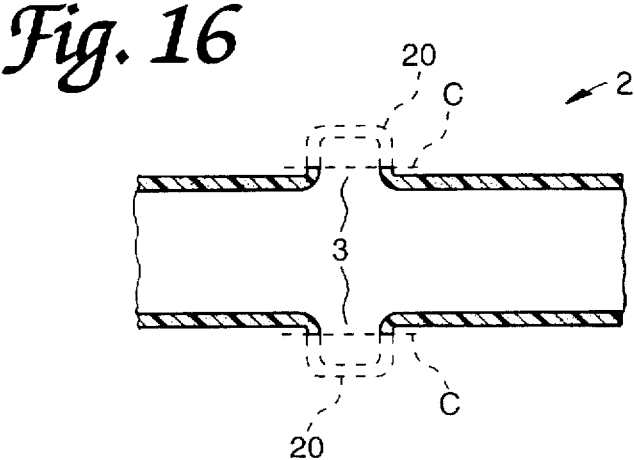
FIG. 16 is a cross-sectional view, taken along an axis of the hose, for illustrating the hose after a cutting step in the Third Preferred Embodiment.

In the Third Preferred Embodiment, the air cleaner hose 2 is prepared as hose 2 which has opposite ends, and an intermediate portion disposed between the opposite ends. FIG. 15 is a perspective view of the hose 2, and FIG. 16 is a major cross-sectional view thereof. As illustrated in FIGS.

15 and 16, the hose 2 has a plurality of arc-like projections 30 on the intermediate portion, and the arc-like projections 30 project in a centrifugal direction. According to the Third Preferred Embodiment, a process for producing a muffler hose having noise-reducing communication holes comprises the steps of blow molding the hose 2 with synthetic resin, and cutting the projections 30 to form the communication holes 3 where the projections 30 have existed.

In the blow-molding step, a separable mold is used. The separable mold has a cavity which conforms to the external configuration of the hose 2 illustrated in FIG. 15. Synthetic resin is extruded like a tube between mold halves of the separable mold, thereby forming a parison. Then, the mold halves are closed, and air is blown into the parison. The parison is expanded, and pressed against the surface of the cavity. Thus, the parison is molded so as to conform to the surface of the cavity, and cooled to cure. Finally, the molded body is cut at the opposite ends to complete the hose 2. Note that the blow-molding operation is an ordinary one, but that it is characterized in that the hose 2 is blow-molded to have a plurality of arc-like projections 30.

Specifically, as illustrated in FIG. 15, the thus blow-molded hose 2 is formed as a curved pipe, and has openings 25, 26 at the opposite ends and bellows 27. The opposite-end openings 25, 26 have a convexed engagement. The bellows 27 absorbs elongation and compression in the axial direction, as well as bending. The hose 2 has four arc-like projections 30 adjacent to the central portion in the axial direction. The projections 30 project in a centrifugal direction, and are present on the same circumference. Connector areas 31 are present between neighboring projections 30, and are formed continuously from the flat surroundings there around. The four projections 30 substantially go around the hose 2.

Figure 17:
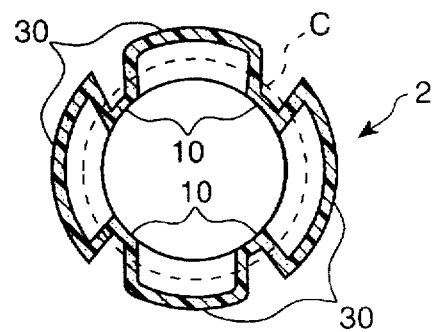
FIG. 17 is a cross-sectional view, taken perpendicularly to the axis of the hose, for illustrating the hose after the cutting step in the Third Preferred Embodiment.

In the cutting step, all of the projections 30 of the hose 2 are cut along the cutting line "C" as illustrated in FIGS. 16 and 17, and the four rectangular communication holes 3 are formed in the periphery of the hose 2 where the arc-like projections 30 have existed.

Note that it is easy to cut the projections 30 without damaging the outer peripheral surface of the surroundings, because the inner peripheral surface of the projections 30 projects outwardly out of the outer peripheral surface of the surroundings as can be seen from FIGS. 16 and 17. In the Third Preferred Embodiment, the hose 2 is cut only at the free end of the projections 30; namely: a cutting edge (not shown) is applied at the bottom of the projections 30, and moved around the hose 2 along the outer peripheral surface in the circumferential direction. It is possible to use a cylindrical cutting edge which conforms to the outer peripheral surface of the hose 2. If such is the case, all of the projections 30 can be cut at the same time by moving the cylindrical cutting edge in the axial direction of the hose 2 and coaxially therewith. In this way, the hose 2 can be manufactured which is connected integrally by four connector areas 31, and which has communication holes 3 formed virtually all around the intermediate portion.

In the production process according to the above-described Third Preferred Embodiment, the blow-molding mold becomes complicated slightly. However, the projections 30 are formed simultaneously at the portions where the communication holes 3 are to be formed. Accordingly, the blow-molding step itself becomes less complicated in terms of actual operability.

In the cutting step, the projections 30 are cut only at the leading end. The cutting operation can be carried out with ease, because the leading ends project outwardly from the outer peripheral surface of the surroundings as can be seen from FIGS. 16 and 17. As a result, in accordance with the Third Preferred Embodiment, the hose 2 having the noise-reducing communication holes 3 at the intermediate portion can be manufactured with a reduced man-hour requirement. Thus, the Third Preferred Embodiment provides an easy and cost-saving process for producing the hose 2.

Note that the hose 2 produced by the Third Preferred Embodiment has the communication holes 3 which go around like a circle by way of the connector areas 31. In other words, the opposite sides of the hose 2 are connected integrally by the connector areas 31. Accordingly, the hose 2 is inseparable at the communication holes 3 in the axial direction. Hence, the blow-molding step can produce the hose 2 whose overall configuration is invariable, and whose axial line scarcely deviates. Consequently, it is unnecessary to carry-out an axial aligning operation onto the hose 2 which is prepared by the Third Preferred Embodiment to provide the communication holes 3 therein. Hence, in the thus manufactured hose 2, there arises no man-hour requirement resulting from an axial aligning operation, and no extra inlet-air resistance resulting from a deviated axial line.

Figure 18:
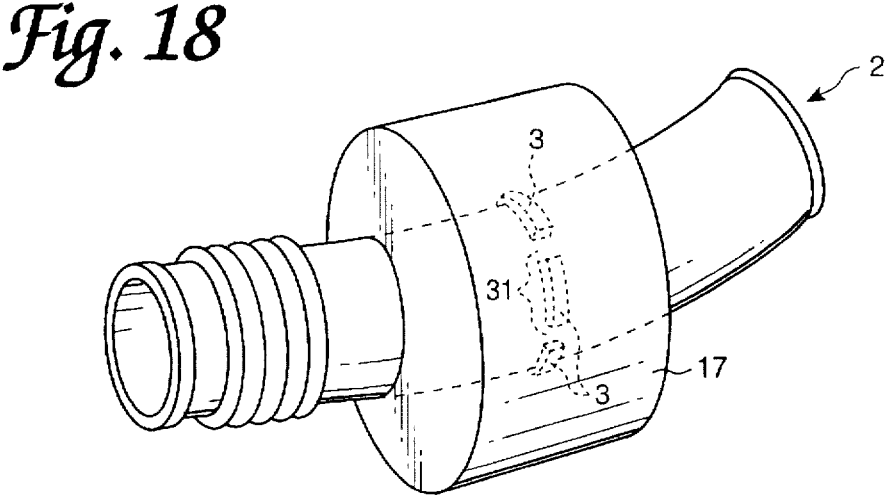
FIG. 18 is a perspective view for illustrating a muffler hose having a plurality of noise-reducing communication holes in the intermediate portion and produced by the Third Preferred Embodiment.

The Third Preferred Embodiment can employ the well-known process, such as the blow-in-blow molding process, to produce the hose 2 which is provided with the communication holes 3, and to complete a muffler hose 1 which is provided with a noise-reducing expansion chamber 17 around the communication holes 3 as illustrated in FIG. 18. Thus, the Third Preferred Embodiment enables one to provide a muffler hose, which exhibits less inlet-air resistance and reduces noises over a wide frequency band, at reduced cost.

Fourth Preferred Embodiment

Figure 19:
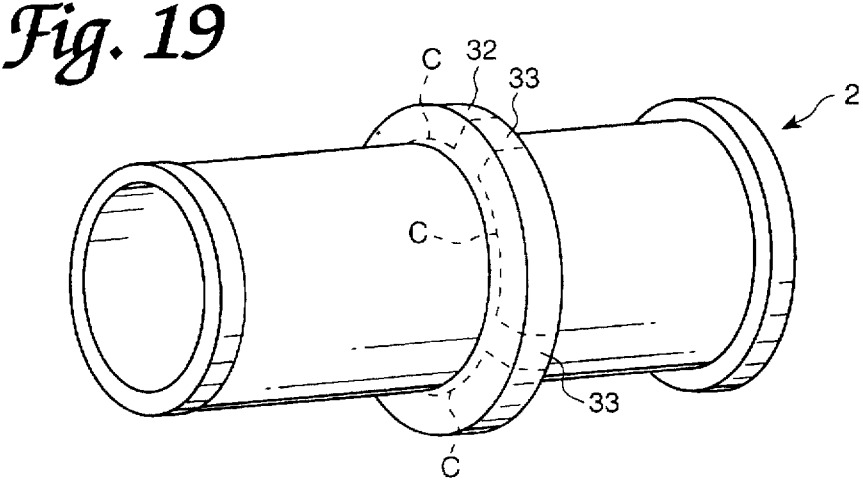
FIG. 19 is a perspective view for illustrating a synthetic-resin hose after a blow-molding step in a Fourth Preferred Embodiment according to the present invention.

The Fourth Preferred Embodiment is a modified version of the Third Preferred Embodiment. Likewise, in the Fourth Preferred Embodiment, the air cleaner hose 2 is prepared as a hose 2 which has opposite ends, and an intermediate portion disposed between the opposite ends. However, the hose 2 has a ring-like projection 32 on the intermediate portion (FIG. 19). The projection 32 goes around the hose 2 in the circumferential direction, and projects in a centrifugal direction. According to the Fourth Preferred Embodiment, a process for producing a muffler hose having noise-reducing communication holes comprises the steps of blow molding the hose 2 with synthetic resin, and cutting the projection 32 to form two or more communication holes 3 at predetermined intervals in the circumferential direction.

In the blow-molding step, the hose 2 is formed to have the ring-like projection 32 on the intermediate portion in the axial direction as illustrated in FIG. 19. The projection 32 projects in a centrifugal direction. That is, the blow-molding step simply requires a blow-molding mold which has a single ring-like concaved cavity corresponding to the intermediate portion of the completed hose 2. Consequently, it is possible to reduce the cost for manufacturing the blow-molding mold.

Figure 20:
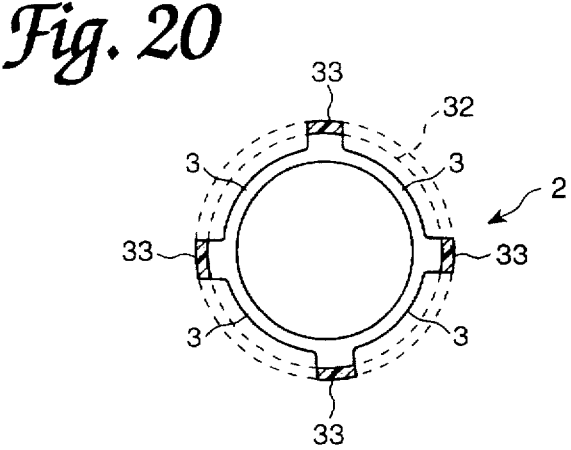
FIG. 20 is a cross-sectional view, taken perpendicularly to an axis of the hose, for illustrating the hose after a cutting step in the Fourth Preferred Embodiment.

In the cutting step, the ring-like projection 32 is cut along the cutting line "C" as illustrated in FIGS. 19 and 20, and the communication holes 3 are formed in a quantity of four in the periphery of the synthetic-resin hose 2 where the arc-like projection 32 had existed. The communication holes 3 are formed as a rectangular shape which opens in a radial direction.

In the Fourth Preferred Embodiment, the hose 2 was cut by a cutting edge which has an edge conforming to the cutting line "C" shown in FIGS. 19 and 20. The hose 2 and the cutting edge are moved relatively in the axial direction to form the communication holes 3. It is possible to use a rotary cutting edge for machining the communication holes 3 one by one. If such is the case, the rotary cutting edge is brought into contact with the ring-like projection 32 in the axial direction to form a communication hole 2. Then, the rotary cutting edge is turned by a predetermined angle to leave a connector area 33, and is operated to form a next communication hole 3.

In the production process according to the above-described Fourth Preferred Embodiment, the cutting edge can be placed slightly apart from the outer periphery of the hose 2 to carry out the cutting, because the inner periphery of the projection 32 projects outward and above the surrounding outer periphery of the hose 2. As a result, the cutting operation can be carried out easily without damaging the outer periphery of the hose 2. The Fourth Preferred Embodiment thus completes the synthetic-resin hose 2 which is connected by the four connector areas 33 and has the noise-reducing communication holes 3 disposed substantially entirely around the intermediate portion.

The Fourth Preferred Embodiment effects the same advantages as those of the Third Preferred Embodiment. In addition, the Fourth Preferred Embodiment is appropriate for producing the hose 2 in a small quantity, because it enables one to prepare the blow-molding mold at reduced cost, compared with the Third Preferred Embodiment.

Fifth Preferred Embodiment

Figure 21:
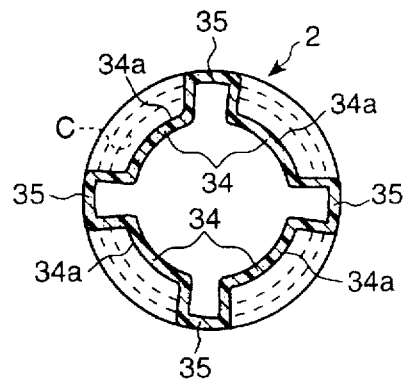
FIG. 21 is a cross-sectional view, taken perpendicularly to an axis of a synthetic-resin hose, for specifically illustrating projections of the hose after a blow-molding step in a Fifth Preferred Embodiment according to the present invention.

In the Fifth Preferred Embodiment as well, the air cleaner hose 2 is prepared as a hose 2 which has opposite ends, and an intermediate portion disposed between the opposite ends. FIG. 21 is a major cross-sectional view of the hose 2, which is taken perpendicularly to the axial direction of the hose 2. As illustrated in FIG. 21, the hose 2 has four arc-like projections 34 which are formed on the same circumference on the inner periphery of the intermediate portion. The arc-like projections 34 project in a centripetal direction. Four connector areas 35 are disposed between the arc-like projections 34, and continue from the flat surroundings. According to the Fifth Preferred Embodiment, a process for producing a muffler hose having noise-reducing communication holes 3 comprises the steps of blow molding the hose 2 with synthetic resin, and cutting the projections 34 to form the communication holes 3 where the projections 34 have existed.

In the blow-molding step, the hose 2 is prepared to have the above-described construction. In the cutting step, all of the projections 34 of the hose 2 are cut along the cutting line "C" as illustrated in FIGS. 21 and 22, and the four rectangular communication holes 3 are formed in the inner periphery of the hose 2.

In the Fifth Preferred Embodiment, the projections 34 are modified to project in a centripetal direction, conversely to the centrifugally-projected projections of the Third Preferred Embodiment. The blow-molding step and the cutting step are carried out in the same manner as those of the Third Preferred Embodiment.

Figure 22:
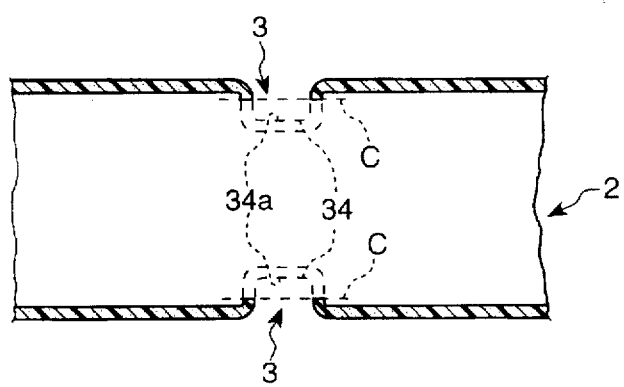
FIG. 22 is a cross-sectional view, taken along the axis of the hose, for illustrating the projections of the hose after a cutting step in the Fifth Preferred Embodiment.

Hence, it is easy to cut the projections 34 without damaging the inner periphery surface of the surroundings, because the outer peripheral surface 34a of the projections 34 is depressed inwardly with respect to the inner peripheral surface of the surroundings as can be seen from FIGS. 21 and 22. For instance, in the Fifth Preferred Embodiment, the hose 2 is cut at the projections 34 with ease; namely: a cutting edge (not shown) is turned around along the inner periphery of the hose 2 to remove the projections 34 one by one, or a cylindrical cutting edge (not shown) which conforms to the inner peripheral surface of the hose 2 is moved along the inner periphery of the hose 2 to remove the projections 34 at once.

The cutting step readily completes the synthetic-resin hose 2 which is connected by the four connector areas 35 and has the noise-reducing communication holes 3 disposed substantially entirely around the intermediate portion.

In accordance with the Fifth Preferred Embodiment, it is possible to produce the hose 2 which has the communication holes 3 with a wide opening area at a reduced man-hour requirement for processing.

Sixth Preferred Embodiment

Figure 23:
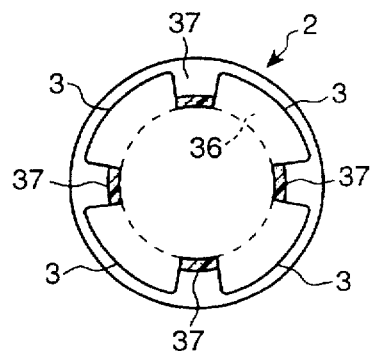
FIG. 23 is a cross-sectional view, taken perpendicularly to an axis of a synthetic-resin hose which is processed to a muffler hose having a plurality of noise-reducing communication holes in the intermediate portion, for specifically illustrating a projection of the hose after a blow-molding step in a Sixth Preferred Embodiment according to the present invention.

Similarly, in the Sixth Preferred Embodiment, the air cleaner hose 2 is prepared as a hose 2 which has opposite ends, and an intermediate portion disposed between the opposite ends. As illustrated with the broken line of FIG. 23, the hose 2 has a ring-like projection 36 which projects in a centripetal direction. As illustrated in FIG. 23, the ring-like projection 36 is cut partially at four positions to form four rectangular noise-reducing communication holes 3, and four connector areas 37 connect the communication holes 3 integrally. Likewise, according to the Sixth Preferred Embodiment, a process for producing a muffler hose having noise-reducing communication holes comprises the steps of blow molding the hose 2 with synthetic resin, and cutting the projection 36 to form the communication holes 3 where the projection 36 has existed.

In the Sixth Preferred Embodiment, the projection 36 is modified to project in a centripetal direction, conversely to the centrifugally-projected projection 32 of the Fourth Preferred Embodiment. Except for this arrangement, the blow-molding step and the cutting step are carried out in the same manner as those of the Fourth Preferred Embodiment.

The blow-molding step requires a simple mold whose cavity surface has a ring-like convex at a portion corresponding to the intermediate portion of the completed hose 2. The ring-like convex projects inwardly. Consequently, in accordance with the Sixth Preferred Embodiment, it is possible to reduce the cost for preparing the blow-molding mold.

Having now fully described the present invention, it will be apparent to one of ordinary skill in the art that many changes and modifications can be made thereto without departing from the spirit or scope of the present invention as set forth herein including the appended claims.

What is claimed is:

1. A process for producing a noise-reducing muffler hose having opposite ends, an intermediate hose disposed between the opposite ends and having a noise-reducing communication hole, a noise-reducing expansion chamber disposed outside of the communication hole, and an extension hose connected to at least one of the opposite ends of the intermediate hose to create a joint area therebetween, the process including the steps of:

fitting protectors, having an outside diameter larger than that of the intermediate hose and the extension hose, at the opposite ends of the intermediate hose, including the extension hose positioned at one end thereof, to plug the opposite ends of the intermediate hose;

disposing the intermediate and extension hoses with the fitted protectors in an open blow-molding mold;

extruding a molten resin tubular parison around the intermediate and extension hoses and the protectors, the tubular parison having opposite ends;

closing the blow-molding mold, ensuring that the opposite ends of the parison are disposed around the protectors and reducing a diameter of the parison at two positions, the two positions being spaced from each other in an axial direction along the parison, the parison contacting the intermediate hose along at least a portion of the two positions and the extension hose and the joint area between the intermediate and extension hoses along at least a portion of one of the two positions such that the parison is adhered to the intermediate hose, the extension hose, and the joint area between the intermediate hose and the extension hose; and blowing air into the parison through at least one of the protectors and the communication hole of the intermediate hose to expand a portion of the parison disposed between the two axially-spaced positions, thereby forming the expansion chamber.

2. The process according to claim 1, prior to said protector-fitting step, further including a step of selecting a protector having opposite ends being tapered like a cone.

3. The process according to claim 1, prior to said protector-fitting step, further including a step of selecting a protector having a plug portion to be fitted into the hose.

4. The process according to claim 3, wherein in said mold-closing step, the plug portions of the protectors contact inner peripheral surfaces of the intermediate hose and the blow-molding mold contacts an outer peripheral surface of the parison, thereby clamping the intermediate hose and the parison between the plugs and the blow-molding mold to inhibit a diameter of the intermediate hose from reducing.

5. The process according to claim 1, subsequent to said air-blowing step, further including a step of deflashing at least a portion of flashes formed at the opposite ends of the parison.

6. The process according to claim 1, prior to said protector-fitting step, further including steps of:

blow molding the intermediate hose with synthetic resin, the intermediate hose having opposite ends, an intermediate portion, and a projection disposed on the intermediate portion, the projection projecting in one of a centripetal and centrifugal direction with respect to the longitudinal axis of the intermediate hose; and cutting at least a part of the projection to form, the noise-reducing communication hole where the projection had existed.

7. The process according to claim 6, wherein, in said blow-molding step, the projection is formed as a ring which is disposed around the intermediate hose in a circumferential direction; and in the cutting step, the ring-shaped projection is cut to form two or more communication holes separated by a predetermined distance in the circumferential direction of the intermediate hose.

8. The process according to claim 6, wherein, in said blow-molding step, the projection is formed as two or more arcs being arranged in a circumferential direction of the intermediate hose; and in the cutting step, the arc-shaped projections are cut to form two or more communication holes where the arc-shaped projections have existed.

9. A process for producing a noise-reducing muffler hose according to claim 1 wherein the noise-reducing muffler hose has two extension hoses connected to the opposite ends of the intermediate hose, the second extension hose being connected to one opposite end of the intermediate hose in the same manner as the first extension hose.

* * * * *